Figure 1:
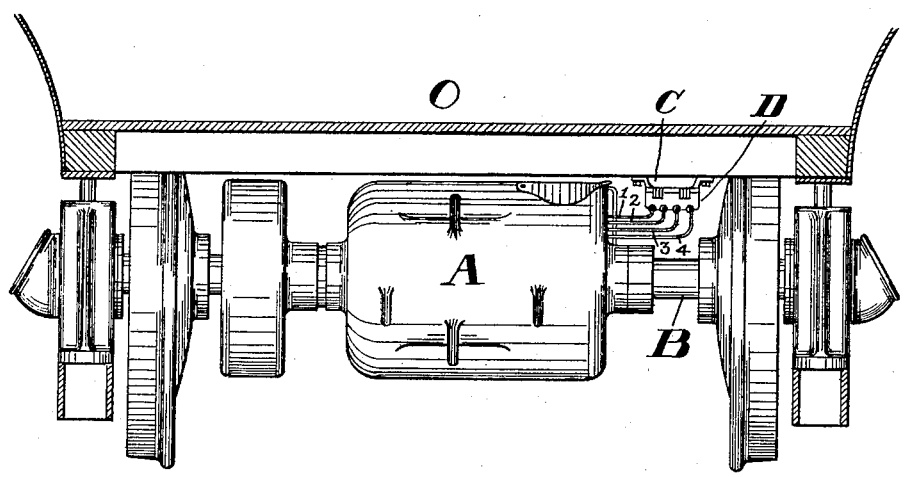

No. 627,502. Patented June 27, 1899.
S. HENDRIE.
MOTOR CONNECTING BOX FOR ELECTRIC RAILWAY VEHICLES.
(Application filed Dec. 24, 1898.)

(No Model.) 3 Sheets—Sheet 1.

WITNESSES: INVENTOR
Strathearn Hendrie
BY
Richard Eyre
ATTORNEY.

No. 627,502. Patented June 27, 1899.
S. HENDRIE.
MOTOR CONNECTING BOX FOR ELECTRIC RAILWAY VEHICLES.
(Application filed Dec. 24, 1898.)
(No Model.) 3 Sheets—Sheet 2.
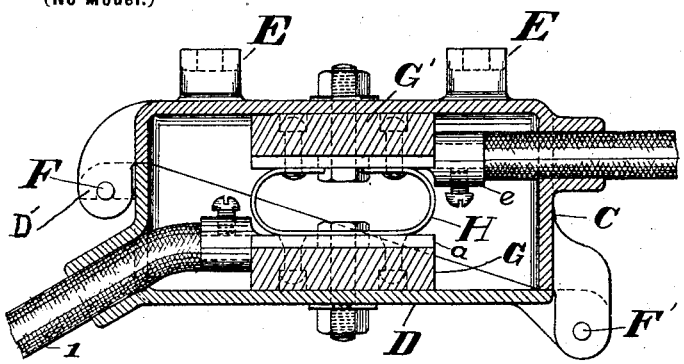
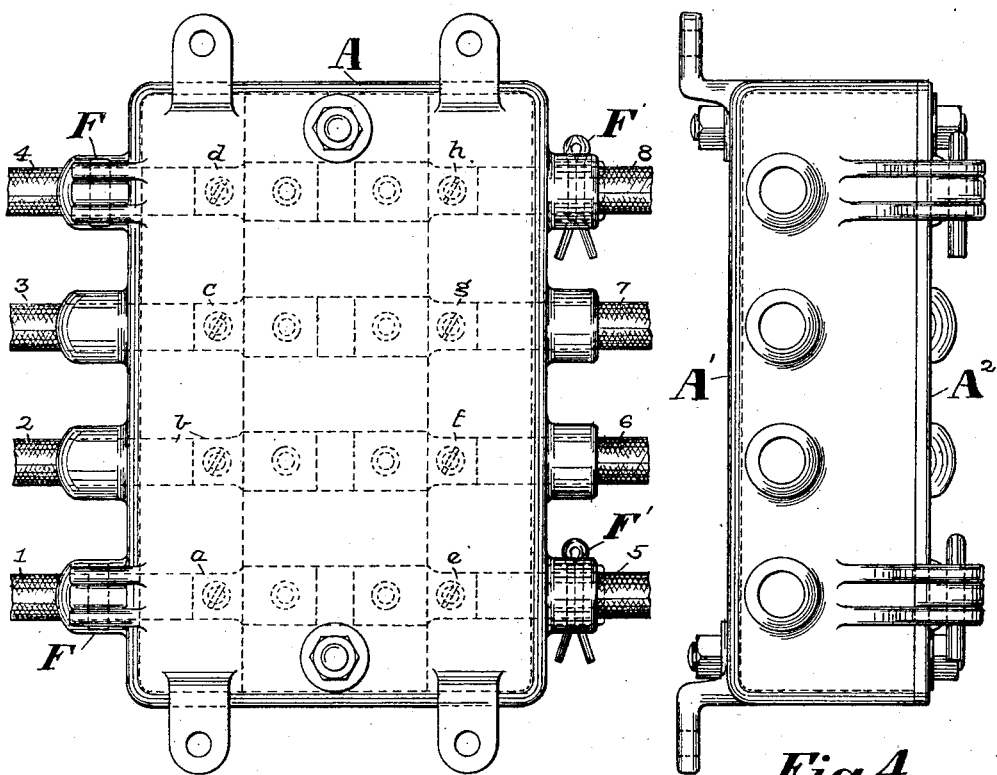

No. 627,502. Patented June 27, 1899.
S. HENDRIE.
MOTOR CONNECTING BOX FOR ELECTRIC RAILWAY VEHICLES.
(Application filed Dec. 24, 1898.)
(No Model.) 3 Sheets—Sheet 3.
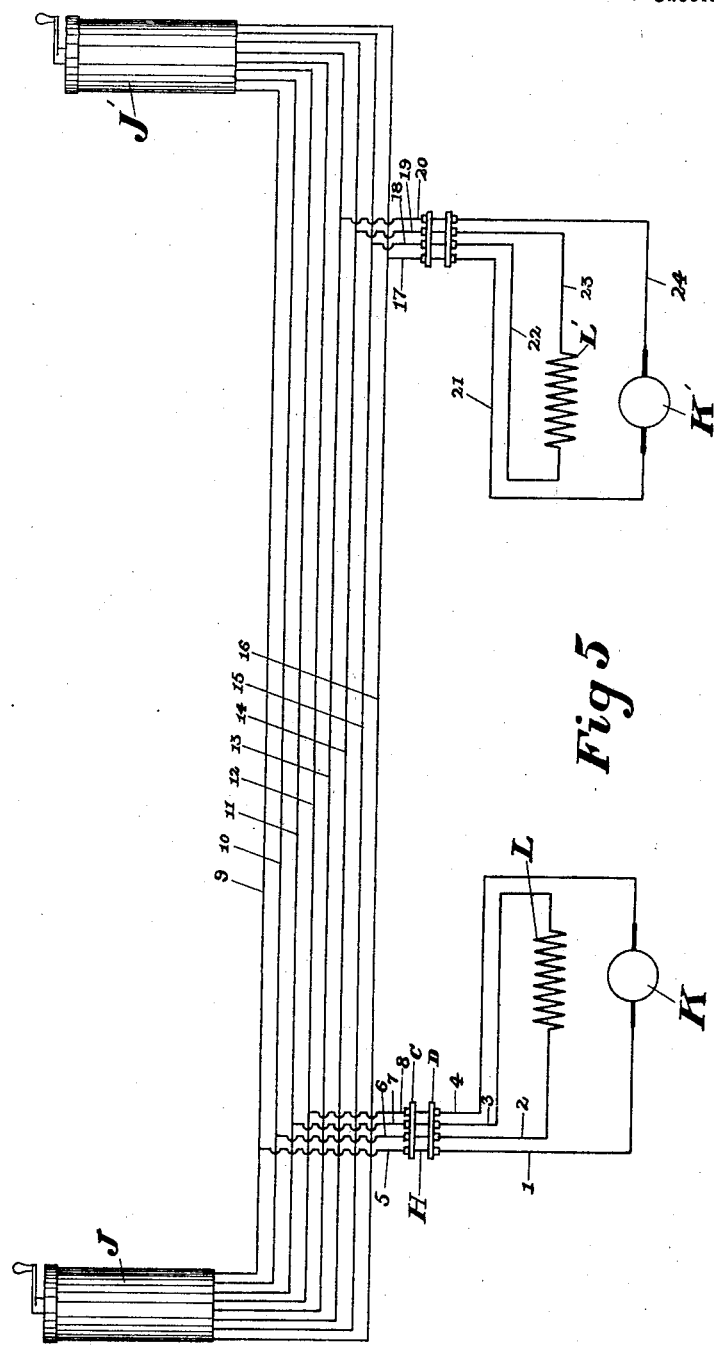

UNITED STATES PATENT OFFICE.

STRATHEARN HENDRIE, OF DETROIT, MICHIGAN, ASSIGNOR TO THE LORAIN STEEL COMPANY, OF OHIO.

MOTOR-CONNECTING BOX FOR ELECTRIC-RAILWAY VEHICLES.

SPECIFICATION forming part of Letters Patent No. 627,502, dated June 27, 1899.

Application filed December 24, 1898. Serial No. 700,376. (No model.)

*To all whom it may concern:*

Be it known that I, STRATHEARN HENDRIE, of Detroit, in the county of Wayne and State of Michigan, have invented a new and useful Motor-Connecting Box for Electric-Railway Vehicles, of which the following is a full, clear, and exact description, reference being had to the accompanying drawings, which form a part of this specification.

Electric-railway vehicles are usually provided with a plurality of operating-motors, which are carried by the truck of the vehicle. The controller or controllers for regulating the course of the current through the motors, resistances, &c., are ordinarily carried by the car-body. When for any reason it is desired to remove the truck or one end thereof from the car-body, the conductors from the controller must be disconnected from the corresponding conductor leading to the motor, and care must be taken to reconnect them in the proper manner when the truck and car-body are again secured together. This is a source of considerable delay in the railway-repair shop and requires that careful and reliable men are employed for the purpose, so that troublesome errors may be avoided as much as possible.

The object of my invention is to provide means whereby this delay is avoided and it is impossible to make any mistake of this nature. This object I attain by the provision of my novel connecting-box, comprising one part which is secured to the car-body and has contacts which are in circuit with the terminals of four conductors leading from the controller, a second part which has contacts in circuit with the terminals of the motor field and armatures, and means for detachably securing the boxes together in such a manner that when the box is closed the proper controller-conductors are put in circuit with the proper motor-conductors through the contacts connected to each.

I show my invention in the accompanying drawings as I prefer to apply it to a railway-car having a controller at each end of the car and two electric motors. It is evident that only slight changes in mechanical detail would be required to apply my invention to a vehicle having more or less motors or more or less controllers than I here show.

Referring to the said drawings, Figure 1 is a cross-section of a car, showing one of the motors and one of my connecting-boxes secured to the car-body in a position adjacent to the motor. Fig. 2 is a cross-section of the connecting-box. Fig. 3 is a plan and Fig. 4 a side view of the same. Fig. 5 is a diagram showing parts of the electric wiring of a car provided with my improved connecting-box.

Referring more particularly to Fig. 1, A is one of the car-motors which is adapted to actuate the axle B of the truck. C is the upper half of my connecting-box, which is secured to the car-body O, and D is the lower half thereof, which is detachably secured to the upper half. 1, 2, 3, and 4 are the conductors, leading from D to the terminals of the motor field and armature.

Referring now to the drawings shown on Sheet 2, the lugs E serve as means for securing the upper part C of the connecting-box to the car-body O. The lower part D of the connecting-box is secured to the part C by means of the pins F', passing through suitable lugs formed on each part of the box. The opposite sides of the box hinge upon the hinge-pin F, the lug D' (shown in dotted lines) simply resting on the pin F, so that when the locking-pins F' are removed the lower half D of the box may be swung downward and lug D' removed from engagement with the pin F. When the interior of the box needs inspection only, the split pins F' may be removed, so that the lower part D will swing back on the hinge-pins F, and the interior of the box is entirely open to examination. Into the lower part of the box lead the conductors 1, 2, 3, and 4 from the motor-terminals, and the ends of these are secured to the terminals $a$, $b$, $c$, and $d$, which are fastened to the insulating-block G in any suitable manner. The conductors 5, 6, 7, and 8, which are in connection with the conductors leading from the controllers, are secured in a similar manner to the terminals $e$, $f$, $g$, and $h$, secured to the insulating-block G' in the upper part C of the box. To each of the terminals $e$, $f$, $g$, and $h$ are secured the spring-contacts H, which when the box is closed bear firmly against the corresponding terminals a, b, c, and d.

As to the construction of this box I desire to say that it may be modified in many details without departing outside the scope of this invention. The central features of the box are that it shall be composed of two parts which are detachably secured to each other, that one of the parts shall have terminals in circuit with the controller-conductors and that the second part shall have terminals in circuit with the motor-conductors, and that the motor-conductor terminals are placed in circuit with the proper controller-conductors when the box is closed. Mere changes in details of construction or arrangement which still retain the central feature of my invention would still be within the scope thereof. For example, that part of the box which carries the motor-conductors might be secured to the truck instead of securing the other part to the car-body. Again, knife switches or plugs might take the place of the contacts H.

Referring to Fig. 5, I show how the wiring of a car having two controllers, two motors, and two of my connecting-boxes would be arranged. I do not, of course, show resistances, canopy-switches, lights, and other portions of the car-wiring, as they have no bearing upon my invention and need not be altered in any way because of the use of my invention. 9, 10, 11, 12, 13, 14, 15, and 16 represent eight conductors, which may be called the "motor-leads," connecting the controllers J and J'. 5, 6, 7, and 8 represent four conductors leading from the conductors 9, 10, 11, and 12 into the parts C of my connecting-box. 1, 2, 3, and 4 represent conductors leading from the part B of my connecting-box to the terminals of the armature K and field L of one of the motors. 17, 18, 19, and 20 represent conductors connected with the main 13, 14, 15, and 16 and corresponding in function to the conductors 5, 6, 7, and 8, respectively. K' and L' represent the armature and field of the other motor, and conductors 21, 22, 23, and 24 correspond in function to conductors 1, 2, 3, and 4, respectively.

Having thus described my invention, what I claim, and desire to protect by Letters Patent, is—

1. The combination with the controller carried by the car-body and the motor carried by the car-truck, of a connecting-box completing the circuits between the controller and motor, comprising a member secured to the vehicle and a second member detachably secured to the first-mentioned member.

2. The combination with a controller, conductors leading therefrom, and a member secured to the car-body and carrying terminals in circuit with said conductors, of the motor, conductors leading therefrom, and a second member carrying terminals in circuit with said motor-conductors and detachably secured to said first-mentioned member with the corresponding terminals of each in electrical connection.

3. The combination of the controllers, the motor-leads extending between said controllers, the members C carrying the terminals in connection with said motor-leads, the motors, the conductors leading from the motor-fields and motor-armatures, and the members D carrying the terminals in connection with said conductors and detachably secured to said members C.

4. The combination in an electrically-propelled vehicle, of the controllers carried by the car-body, the motors carried by the truck, the top of the connecting-box secured to the car-body, in circuit with the controller-conductors, and carrying a plurality of spring-contacts, and the bottom of the connecting-box hinged to the said top, and having terminals engaged by said spring-contacts.

5. The combination of a two-part box, controller-terminals secured within one of said parts, motor-terminals secured within the other of said parts, and hinge-pin connections between the said parts and at both sides of the same, one of said members resting on the hinge-pin connections at one side of the box but without surrounding the same, substantially as described.

6. The combination of the box members C and D, lugs at each side of each of said box members, hinge-pins between each pair of lugs, the lugs D' at one side of one of said box members bearing on only one side of its hinge-pin, controller-terminals secured within one of said box members, and motor-terminals connected within the other of said members, substantially as described.

7. The combination of the box members C and D, lugs at each side of each of said box members, hinge-pins between each pair of lugs, the lugs D' at one side of one of said box members bearing on only one side of its hinge-pin, controller-terminals secured within one of said box members, motor-terminals connected within the other of said members, and contact-springs connecting said controller and motor terminals when the box is closed, substantially as described.

In testimony whereof I have affixed my signature in presence of two witnesses.

STRATHEARN HENDRIE.

Witnesses:
 TRYON W. GORMAN,
 JNO. W. WILLIAMS.